US012113325B2

(12) United States Patent
Wu

(10) Patent No.: US 12,113,325 B2
(45) Date of Patent: Oct. 8, 2024

(54) TERMINAL BLOCK BUS STRUCTURE AND BUS MODULE THEREOF

(71) Applicants: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Kunshan (CN); LI YANG ELECTRIC MACHINERY (DONGGUAN) CO., LTD., Dong Guan (CN)

( * ) Notice: Subject to any disclaimer, the term of this patent is extended or adjusted under 35 U.S.C. 154(b) by 235 days.

(21) Appl. No.: 17/834,899

(22) Filed: Jun. 7, 2022

(65) Prior Publication Data

US 2023/0396002 A1 Dec. 7, 2023

(51) Int. Cl.
*H01R 9/26* (2006.01)
*H01R 9/16* (2006.01)
*H01R 9/24* (2006.01)

(52) U.S. Cl.
CPC ............. *H01R 9/2608* (2013.01); *H01R 9/16* (2013.01); *H01R 9/2458* (2013.01); *H01R 9/2616* (2013.01)

(58) Field of Classification Search
CPC . H01R 9/26; H01R 9/267; H01R 9/16; H01R 9/2608; H01R 9/2458; H01R 9/2616
See application file for complete search history.

(56) References Cited

U.S. PATENT DOCUMENTS 9,515,461 B2 * 12/2016 Billman ............... H01R 13/514
11,670,899 B2 * 6/2023 Berg .................... H01R 9/2608
439/366

FOREIGN PATENT DOCUMENTS

DE 10351479 A1 * 5/2004 ............. H02B 1/052
DE 202017104591 U1 * 12/2018 ........... H01R 9/2408

* cited by examiner

*Primary Examiner* — Renee S Luebke
*Assistant Examiner* — Paul D Baillargeon
(74) *Attorney, Agent, or Firm* — Chun-Ming Shih; HDLS IPR SERVICES

(57) ABSTRACT

A bus module (100) includes an insulating body (10) and multiple conductors (20), and the insulating body (10) includes a first insulator (11), a second insulator (12) installed at a position corresponding to the first insulator (11), and two locking arm (111) installed on two sides of the first insulator (11) separately. Each conductor (20) is parallelly embedded in the insulating body (10) and includes a lapping plate (21), a clamping portion (22) extended from the lapping plate (21) and an end pin (23) extended from the lapping plate (21) in a direction away from the clamping portion (22), and the lapping plate (21) is disposed between the first insulator (11) and the second insulator (12) and exposed to the outside, and the clamping portion (22) is accommodated in the second insulator (12), and the end pin (23) is accommodated in the first insulator (11).

10 Claims, 10 Drawing Sheets

TERMINAL BLOCK BUS STRUCTURE AND BUS MODULE THEREOF

BACKGROUND OF THE DISCLOSURE

Technical Field

The technical field relates to a terminal block bus structure, and more particularly relates to a terminal block bus structure provided for installing a terminal block.

Description of Related Art

Terminal block is a common connecting component and widely used in the area of industrial equipment such as industrial communication for combining two or more power cords, control lines and/or data transmission lines. The terminal block is usually installed on a bus structure, and the bus structure mainly includes a rail and a plurality of strip-shaped conductive plates, and each terminal block can share the power supply and signal through the conductive plates of the bus structure.

The conductive plate of the bus structure generally has a fixed length, so that the conductive plates of the bus structure are partially exposed if the quantity is less or width of the terminal blocks is smaller, and it needs a cover to cover the conductive plates in order to avoid short circuit or prevent foreign matters from entering into the bus structure. If the quantity is more or width of the terminal blocks is larger, the length of the conductive plates of the bus structure are not enough, so that how to adjust the bus structure to meet the requirements of different lengths of the conductive plates demands immediate attentions and feasible solutions.

In view of the aforementioned problems, the discloser proposed this disclosure based on his expert knowledge and elaborated researches to overcome the problems of the related art.

SUMMARY OF THE DISCLOSURE

The primary objective of this disclosure is to enable the bus module to be serially connected and assembled with a rail to form a terminal block bus structure, which is provided for installing the terminal blocks of different quantities or widths.

To achieve the aforementioned and other objectives, this disclosure discloses a bus module including an insulating body and a plurality of conductors, and the insulating body includes a first insulator, a second insulator installed at a position corresponding to the first insulator, and two locking arms installed on two sides of the first insulator separately, and each conductor is parallelly embedded in the insulating body, and each conductor includes a lapping plate, a clamping portion extended from the lapping plate, and an end pin extended from the lapping plate in a direction away from the clamping portion, and the lapping plate is disposed between the first insulator and the second insulator and exposed to the outside, and the clamping portion is accommodated in the second insulator, and the end pin is accommodated in the first insulator.

To achieve the aforementioned and other objectives, this disclosure further discloses a terminal block bus structure including a rail and at least two bus modules, and two wedge sections extended outwardly from left and right sides of the rail, and the bus modules are serially connected with each other and mounted on the rail, and each of the bus modules includes an insulating body and a plurality of conductors parallelly embedded in the insulating body, and two sides of the insulating body have a locking arm separately, and the locking arm is snapped in the corresponding wedge section, and each conductor includes a lapping plate, a clamping portion and an end pin, and the lapping plate is exposed from the insulating body, and the clamping portion and end pin are connected to two opposite sides of the lapping plate respectively, and the clamping portion of one of the bus modules elastically clamps the end pin of another bus module.

This disclosure has the following effects. The first insulator and the second insulator are connected by snapping and fixing the combining column of the second insulator into the combining hole of the first insulator. With a slot of the first insulator, the plug column of the second insulator of another bus module is plugged into the slot, and the clamping portion in the plug column may elastically clamp the end pin in the slot. In addition, the locking arms of the first insulator may be snapped on the wedge sections on the two sides of the rail respectively, and the foolproof structure of the first insulator may prevent the terminal block from being installed in a wrong direction.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
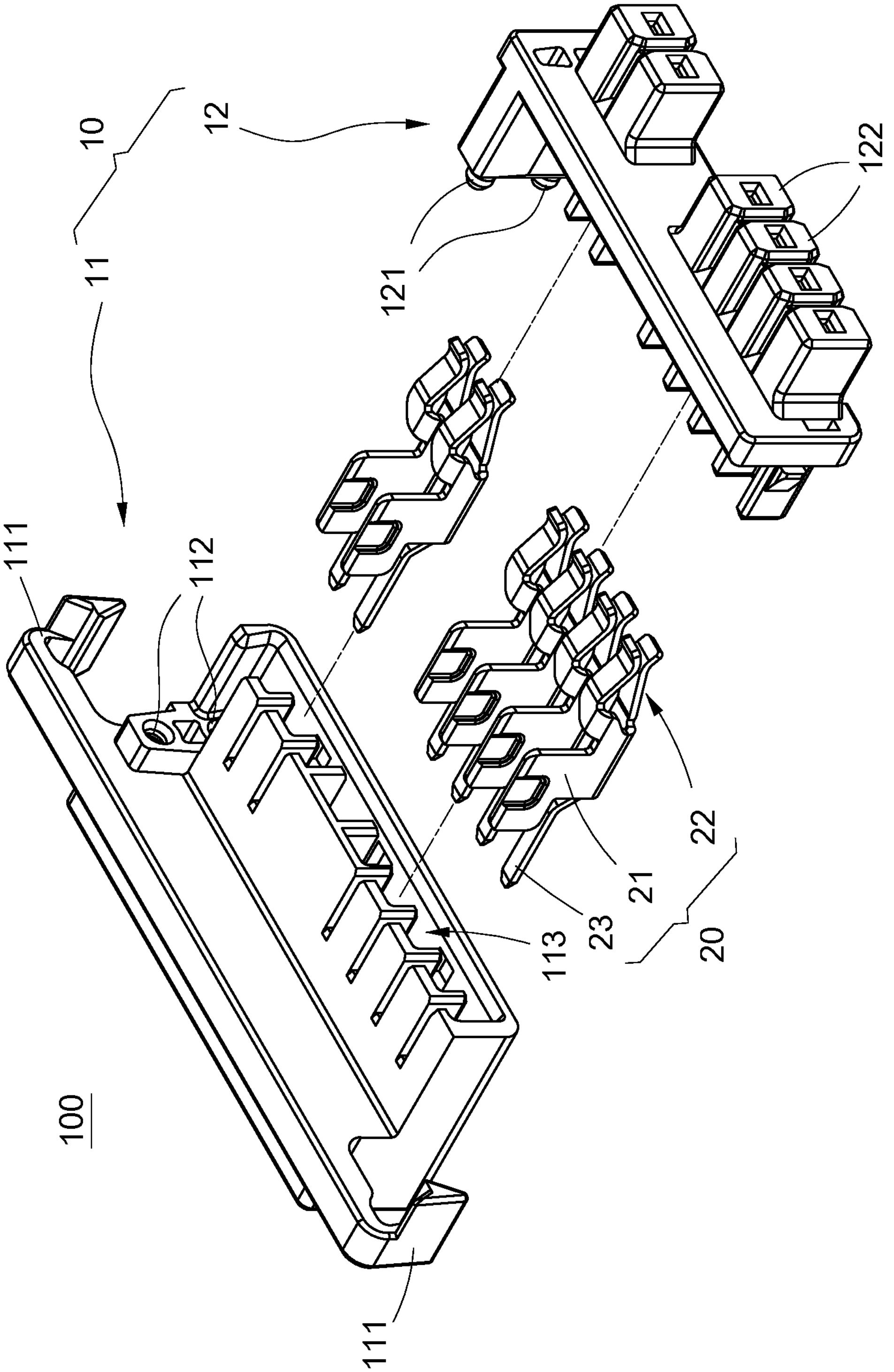
FIG. 1 is an exploded view of a bus module of this disclosure.

With reference to FIG. 1 for a bus module 100 of this disclosure, the bus module 100 mainly includes an insulating body 10 and a plurality of conductors 20.

In this embodiment, the insulating body 10 is integrally formed by plastic injection molding, but this disclosure is not limited to thereto. For example, the insulating body 10 may also be made of rubber or any other insulating materials. The insulating body 10 includes a first insulator 11, a second insulator 12 installed at a position corresponding to the first insulator 11, and two locking arms 111 installed on two sides of the first insulator separately. Specifically, the first insulator 11 has a plurality of combining holes 112 concavely formed thereon, and the second insulator 12 has a plurality of combining columns 121 convexly formed thereon, and each combining column 121 is snapped and fixed into each corresponding combining hole 112 to combine the first insulator 11 with the second insulator 12, but this disclosure is not limited thereto. For example, the first insulator 11 and the second insulator 12 may also be fixed by hook or screw connection.

Figure 10:
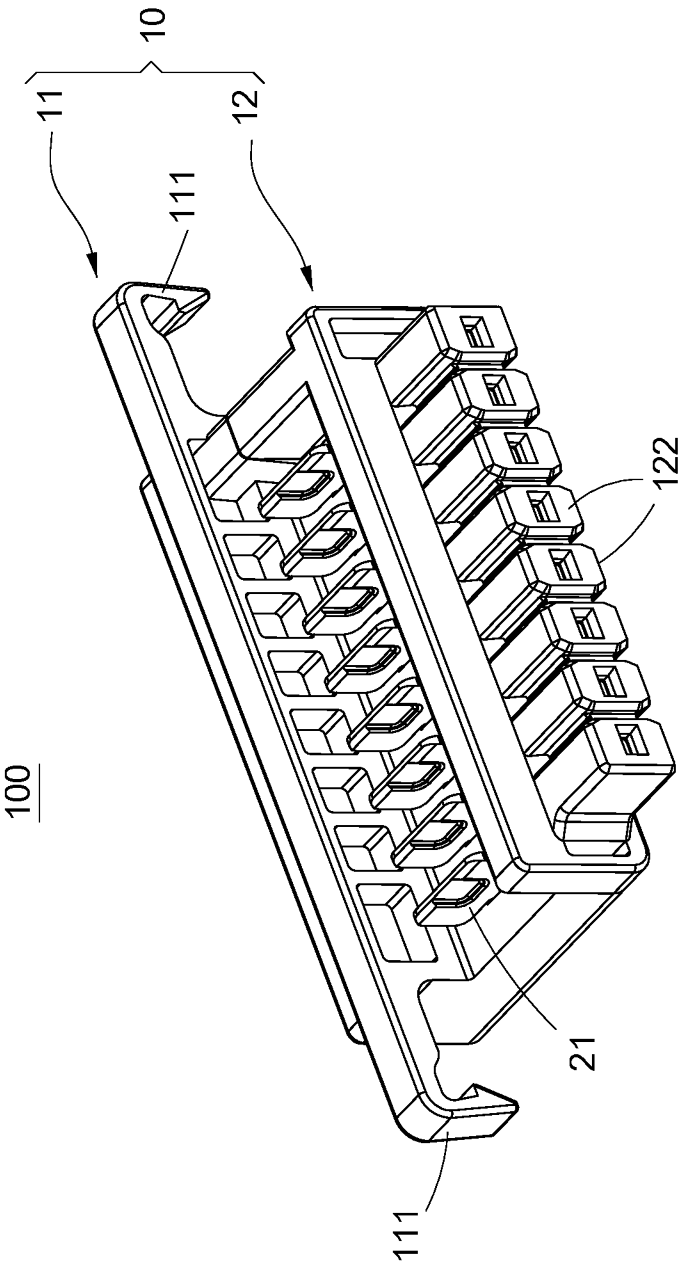
FIG. 10 is a schematic view of a bus module with eight conductors in accordance with this disclosure.

In this embodiment, the conductor 20 is made of a metal alloy with desirable electrical conductivity, such as phosphor bronze, brass, or stainless steel, but this disclosure is not limited thereto. Each conductor 20 is parallelly embedded into the insulating body 10. Specifically, each conductor 20 includes a lapping plate 21, a clamping portion 22 extended from the lapping plate 21, and an end pin 23 extended from the lapping plate 21 in a direction away from the clamping portion 22. The lapping plate 21 is disposed between the first insulator 11 and the second insulator 12 and exposed to the outside, and the clamping portion 22 is accommodated in the second insulator 12, and the end pin 23 is accommodated in the first insulator 11. In this embodiment, there are six conductors 20, but this disclosure is not limited thereto. The quantity and arranged position of the conductors 20 may be adjusted according to the application requirements. For example, the quantity of conductors 20 may also be eight and the conductors may be arranged equidistantly from one another as shown in FIG. 10.

Further, the first insulator 11 has at least one slot 113, and the quantity of slot 113 is three in this embodiment, but this disclosure is not limited thereto. The end pin 23 of each conductor 20 is accommodated in the slot 113. The second insulator 12 has a plurality of plug columns 122 convexly and parallelly formed on a side of the second insulator 12 away from the first insulator 11. The quantity of plug column 122 is corresponding to the quantity of conductor 20, and the clamping portion 22 of each conductor 20 is plugged into each plug column 122. In addition, the first insulator 11 and the second insulator 12 have a plurality of notches (not labelled in the figures) for the lapping plate 21 of each conductor 20 to be exposed from the insulating body 10.

Figure 2:
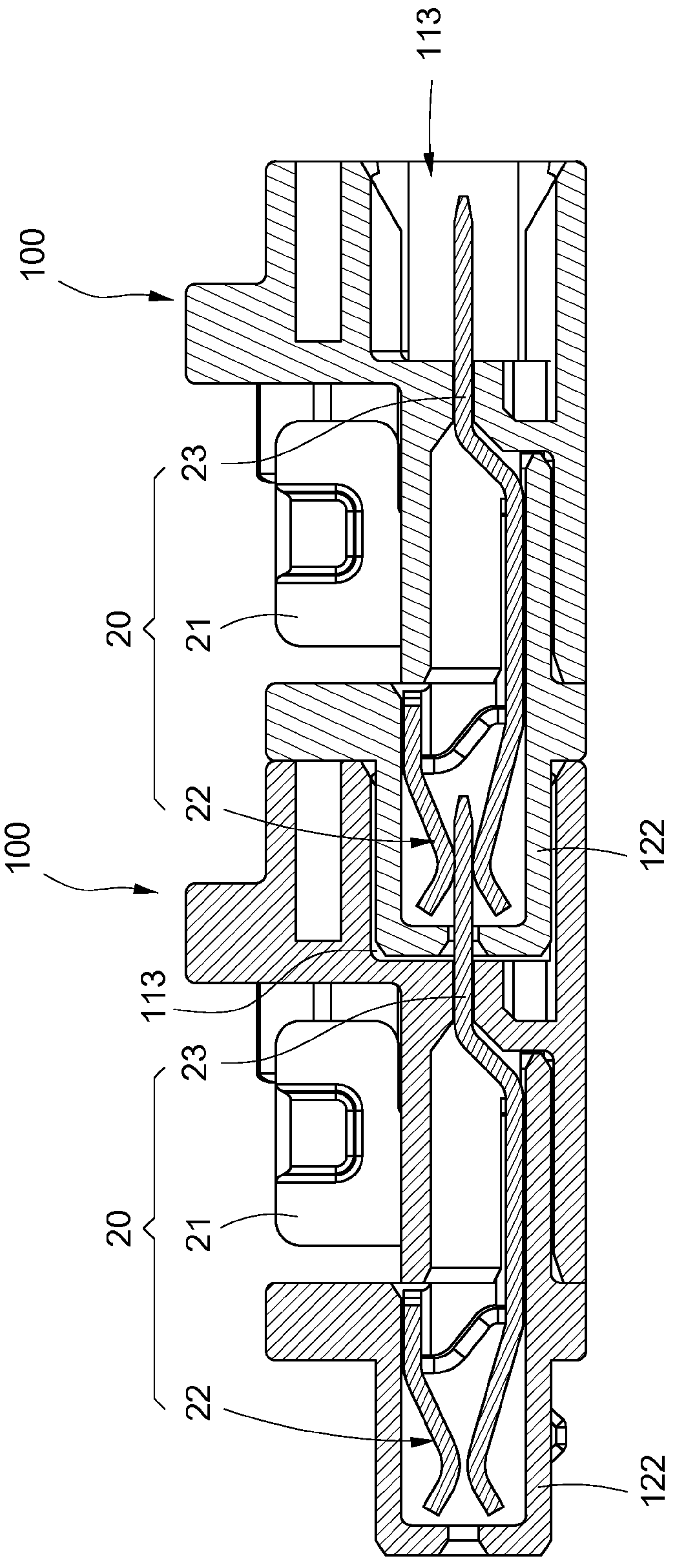
FIG. 2 is a cross-sectional view of a serially connected bus module of this disclosure.
Figure 3:
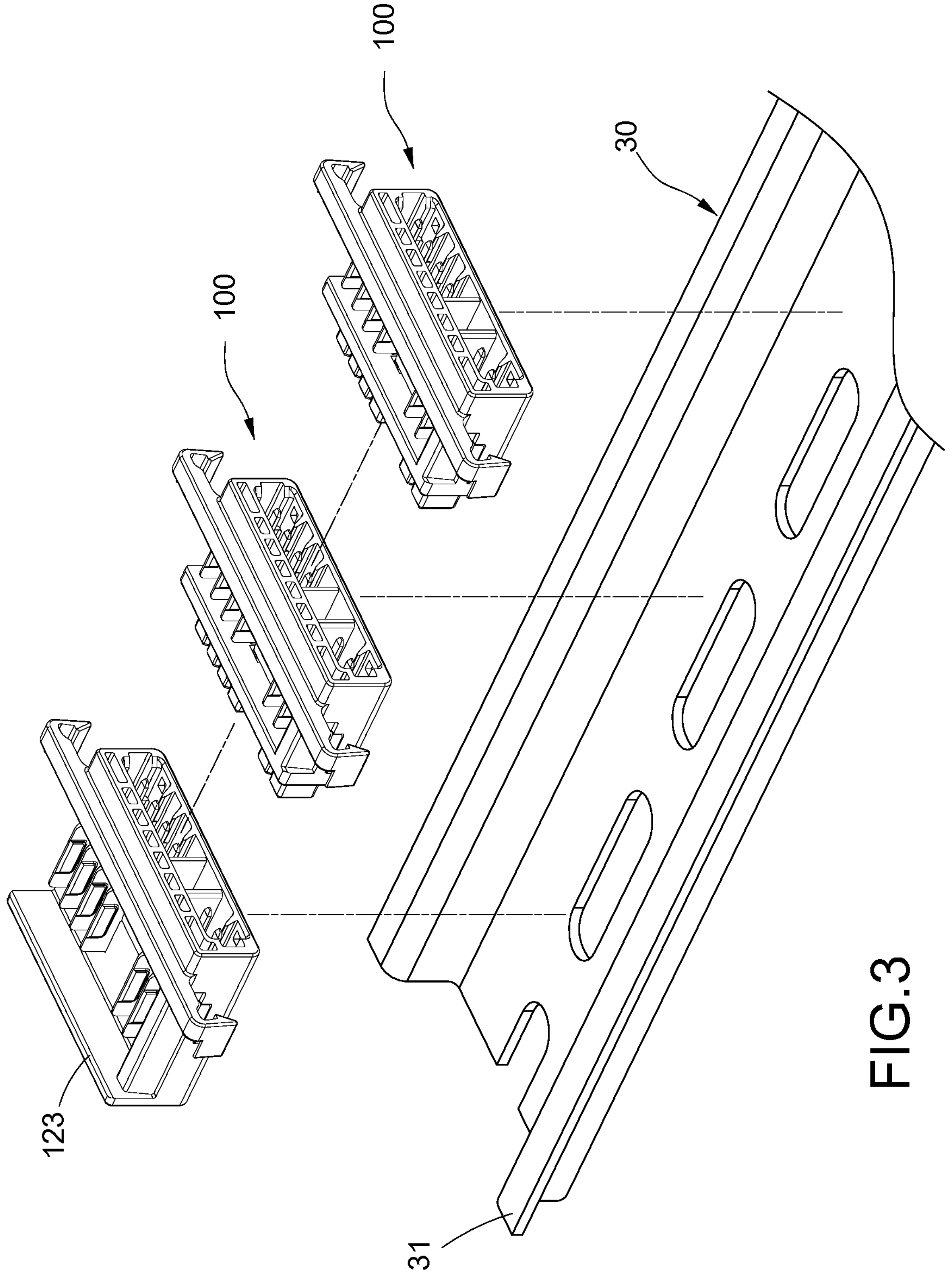
FIG. 3 is an exploded view of a terminal block bus module of this disclosure.

With reference to FIG. 2 for the cross-sectional view of a bus module 100 of this disclosure which is serially connected to another bus module 100 of this disclosure, each plug column 122 of a bus module 100 is plugged into the slot 113 of another bus module 100, such that each clamping portion 22 in each plug column 122 elastically clamps each end pin 23 in another bus module 100 to form an electrical connection and achieve the effect of connecting each bus module 100 in series.

With reference to FIGS. 3 to 7 for a terminal block bus structure of this disclosure provided for installing a plurality of terminal blocks A, the terminal block bus structure mainly includes a rail 30 and the at least two bus modules 100.

Figure 4:
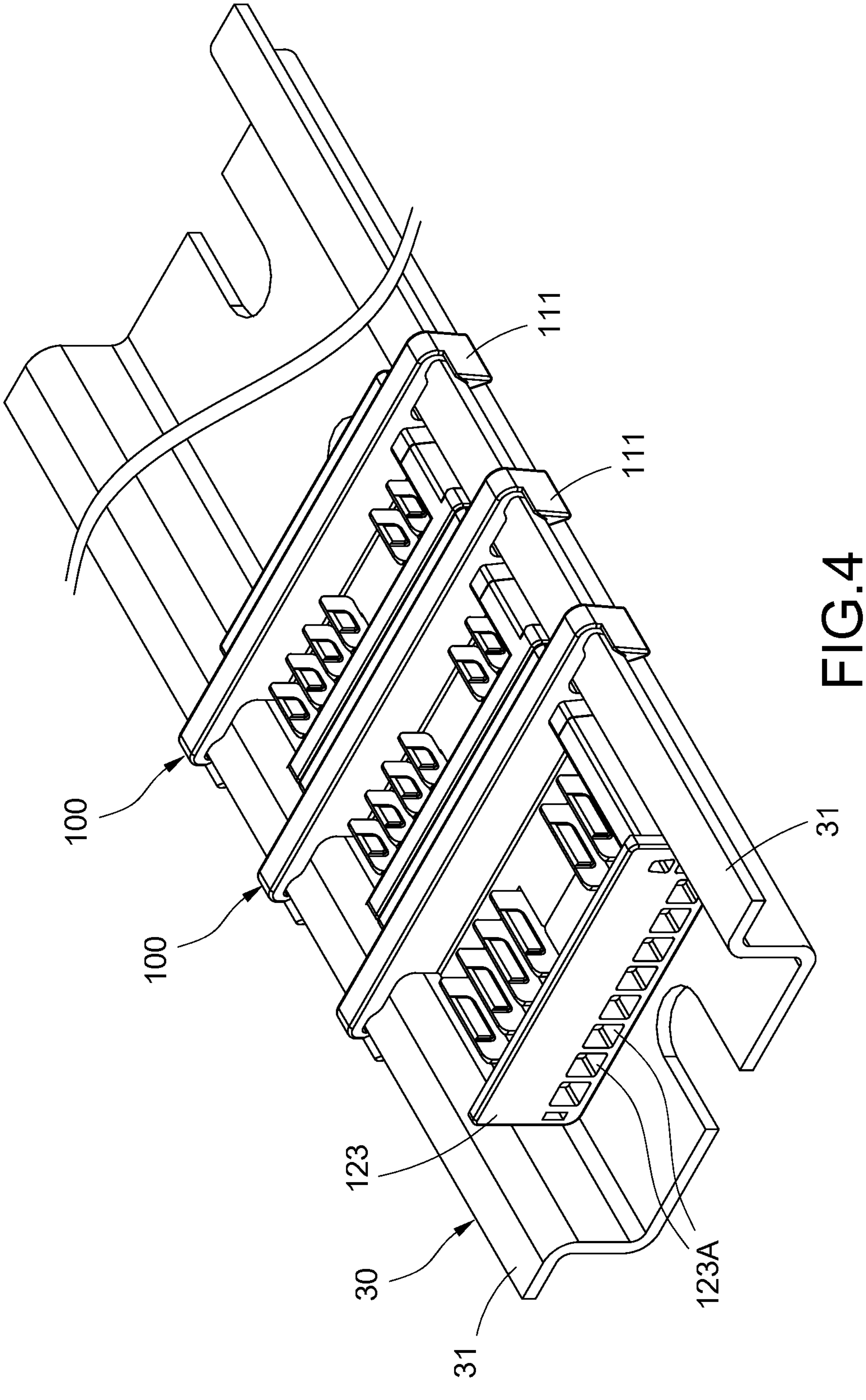
FIG. 4 is a perspective exploded view of a terminal block bus structure of this disclosure.
Figure 5:
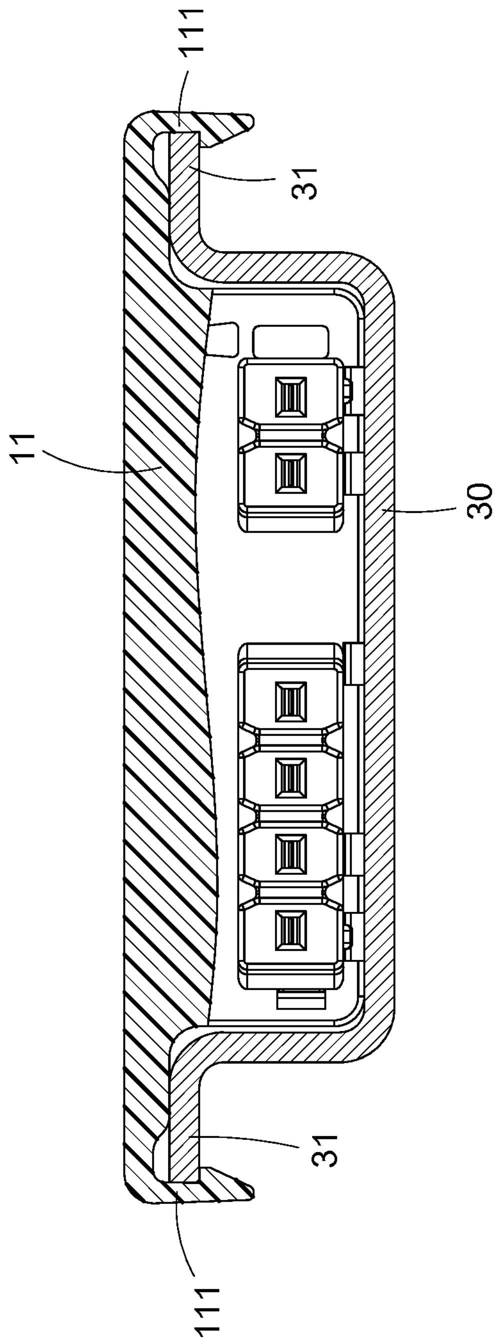
FIG. 5 is a cross-sectional view of a terminal block bus structure of this disclosure.

The rail 30 is in a long-strip shape with a U-shaped cross section, but this disclosure is not limited thereon. In this embodiment, the rail 30 may be a standard rail commercially available on the market, which is cut to a specific length according to different requirements. Two wedge sections 31 are extended from left and right sides of the rail 30 separately, and each wedge section 31 is provided for snapping each locking arm 111 on left or right side of the first insulator 11 in each bus module 100, such that each bus module 100 is fixed onto the rail 30 as shown in FIGS. 4 and 5.

In this embodiment, there are three bus modules 100, but this disclosure is not limited thereto, and the quantity of bus module 100 may be determined by the quantity of terminal block. The bus modules 100 are serially connected along the longitudinal direction of the rail 30 and mounted to the rail 30, and each plug column 122 of the bus module 100 serially connected at the back is plugged into a slot 113 of the bus module 100 which is serially connected at the front, such that each clamping portion 22 in each plug column 122 elastically clamps each end pin 23 in the slot 113 to form an electrical connection. It is noteworthy that the second insulator 12 of the frontmost serially connected bus module 100 does not have a plurality of plug columns 122, but it has a baffle plate 123, and the baffle plate 123 includes a plurality of jacks 123A provided for users to plug and connect a plurality of wire connectors (not shown in the figures) into each clamping portion 22. As a result, each plug column 122 may not be exposed and has a neat and aesthetic appearance.

Figure 6:
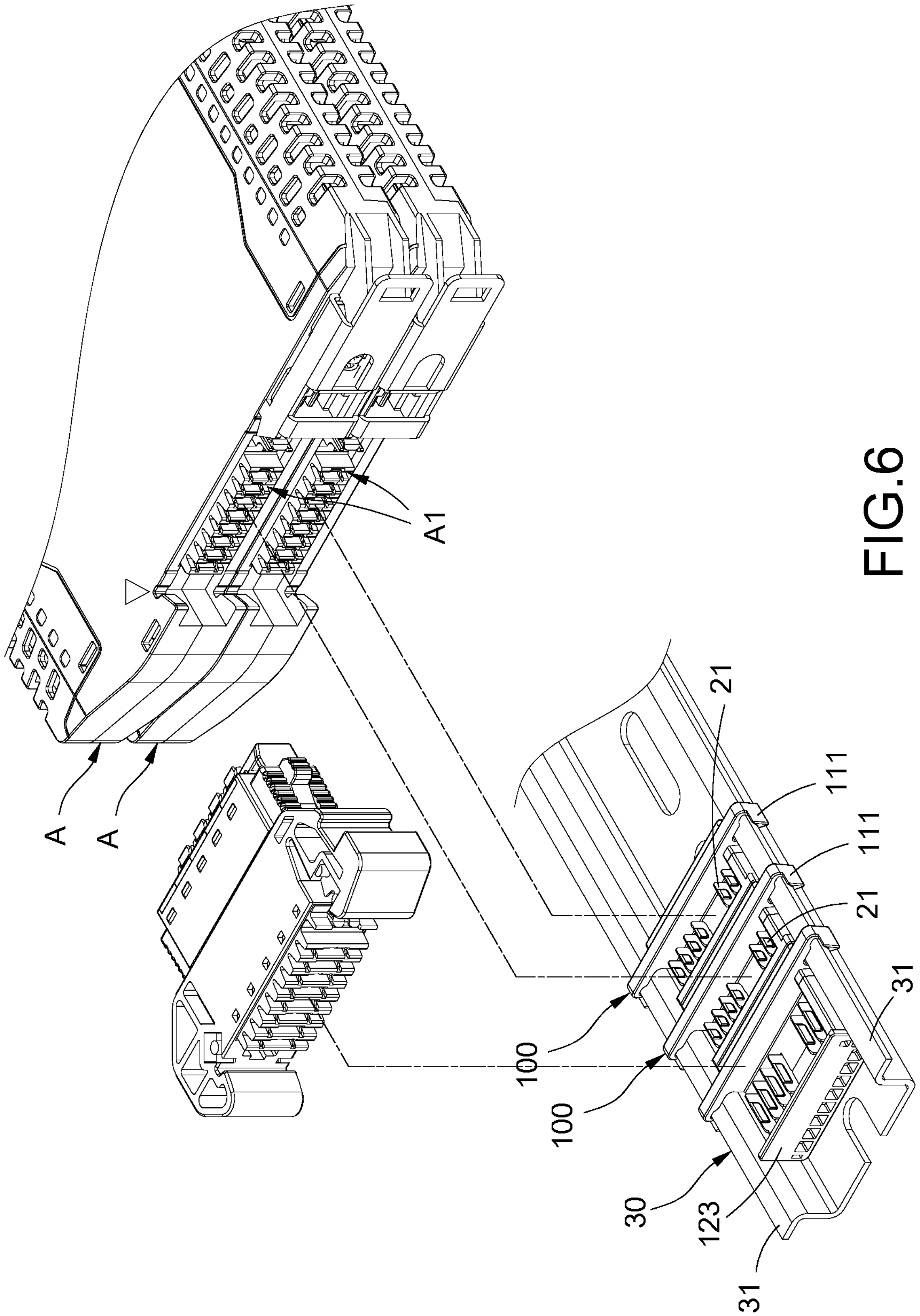
FIG. 6 is an exploded view of a terminal block bus structure and a terminal block of this disclosure.
Figure 7:
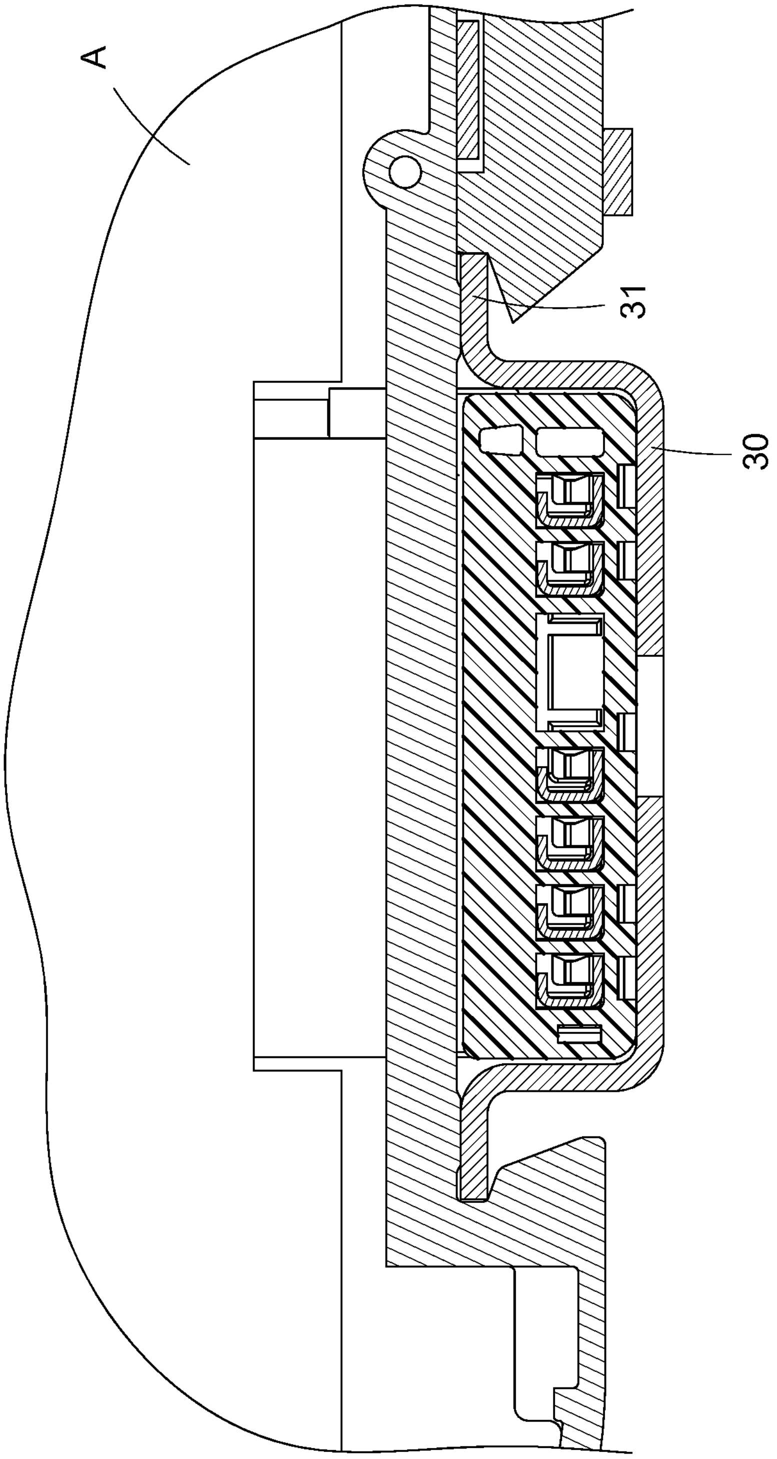
FIG. 7 is a partially cross-sectional view of a terminal block bus structure and a terminal block of this disclosure.

In FIGS. 6 and 7, each terminal block A is arranged corresponding to each bus module 100 and snapped to the wedge sections 3 on two sides of the rail 30. Each of the terminal blocks A includes a plurality of knife gate assemblies A1 arranged parallelly, so that when each terminal block A is installed at a position corresponding to each bus module 100, each knife gate assembly A1 clamps each lapping plate 21 to form an electric conduction.

Figure 8:
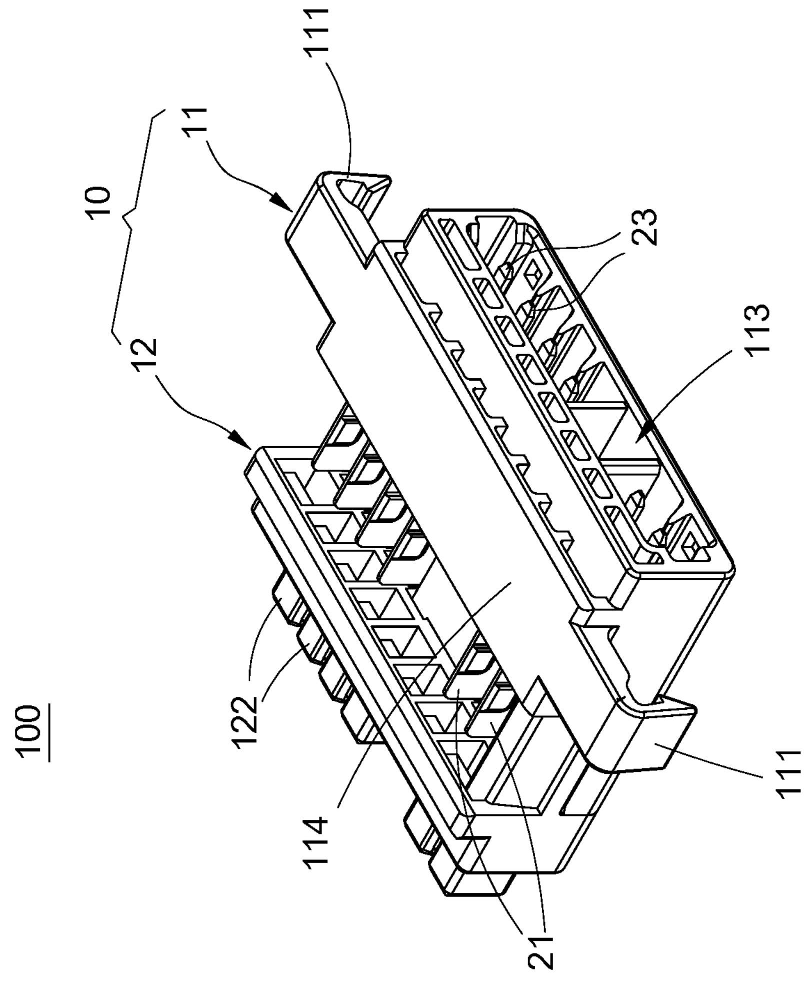
FIG. 8 is a perspective view of a bus module in accordance with another embodiment of this disclosure.
Figure 9:
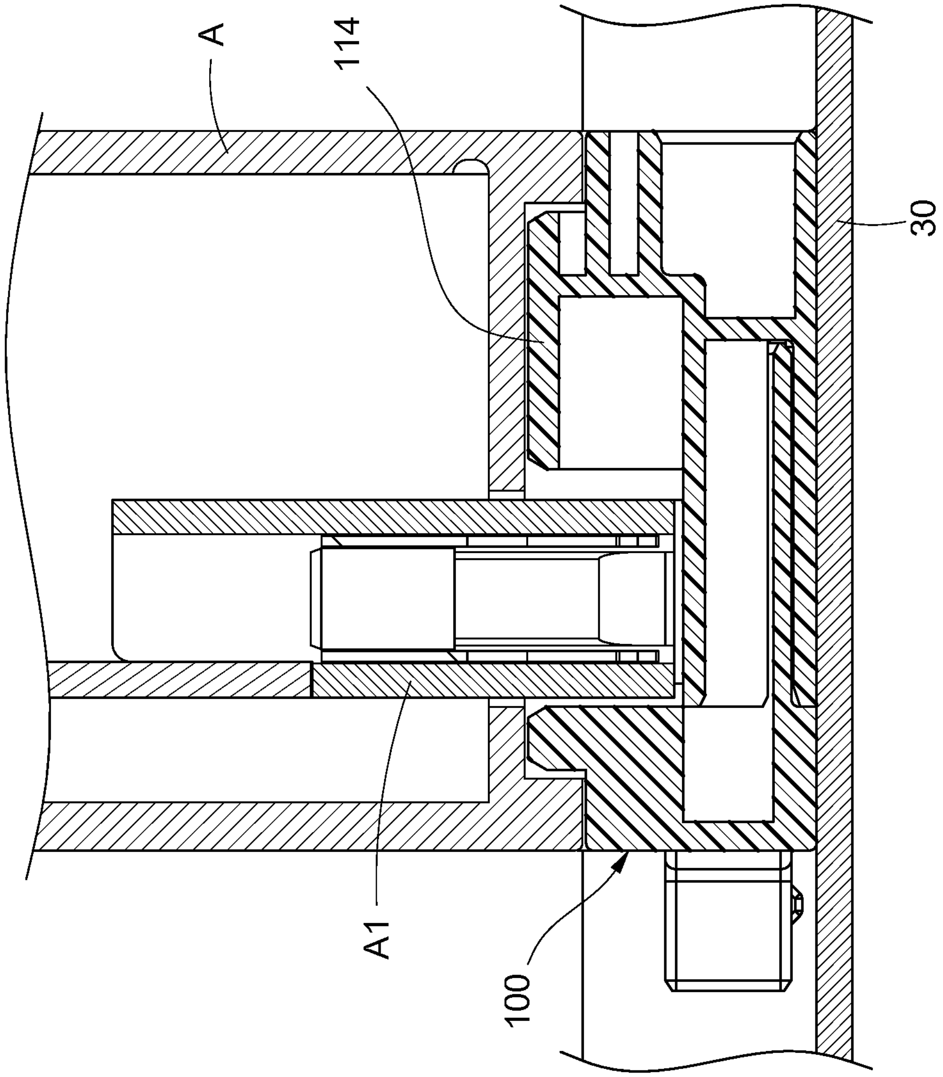
FIG. 9 is a cross-sectional view showing a using status of another embodiment of this disclosure.

In FIGS. 8 and 9, the bus module 100 of this disclosure further includes a foolproof structure 114 provided for preventing users from installing the terminal block A in a wrong direction. In this embodiment, the foolproof structure 114 is a rectangular block mounted onto the first insulator 11. Specifically, the foolproof structure 114 is disposed on a side of each lapping plate 21 away from the second insulator 12, and extended along the connecting direction of the first insulator 11 and the second insulator 12, but this disclosure is not limited thereto. For example, the foolproof structure 114 may also be mounted on the second insulator 12 or in another shape. In this way, if the terminal block A is mounted onto the bus module 200, each knife gate assembly A1 may be misaligned with the foolproof structure 114 as shown in FIG. 9. When a user installs the terminal block A onto the bus module 200 in a wrong direction, each knife gate assembly A1 may interfere with the foolproof structure 114 and the terminal block A may not be installed on the bus module 100. In this embodiment, the foolproof structure 114 is connected to each locking arm 111 to facilitate the mold processing by plastic injection molding, but this disclosure is not limited thereto.

In summation of the description above, this disclosure can surely achieve the expected objectives and overcome the drawbacks of the prior art. While this disclosure has been described by means of specific embodiments, numerous modifications and variations could be made thereto by those skilled in the art without departing from the scope and spirit of this disclosure set forth in the claims.

What is claimed is:

1. A bus module, comprising:

an insulating body (10), comprising a first insulator (11), a second insulator (12) installed at a position corresponding to the first insulator (11) along a longitudinal direction, and two locking arms (111) installed on two sides of the first insulator (11) separately; and a plurality of conductors (20), parallelly embedded in the insulating body (10), and each of the conductors (20) comprising a plate portion (21), a clamping portion (22) extended from the plate portion (21) in the longitudinal direction, and an end pin (23) extended from the plate portion (21) in the longitudinal direction away from the clamping portion (22), and the plate portion (21) exposed out of and disposed between the first insulator (11) and the second insulator (12), and the clamping portion (22) accommodated within the second insulator (12), and the end pin (23) accommodated within the first insulator (11).

2. The bus module according to claim 1, wherein the first insulator (11) comprises at least one slot (113), and the end pin (23) is accommodated in the slot (113).

3. The bus module according to claim 1, wherein the second insulator (12) comprises a plurality of plug columns (122) disposed on a side away from the first insulator (11), and the clamping portion (22) is plugged in one of the plug column (122).

4. The bus module according to claim 1, wherein the first insulator (11) comprises a plurality of combining holes (112), and the second insulator (12) comprises a plurality of combining columns (121), and the combining columns (121) are snapped and fixed in the combining holes (112) respectively.

5. The bus module according to claim 1, wherein the first insulator (11) comprises a foolproof structure (114) disposed on a side of the plate portion (21) away from the second insulator (12).

6. A terminal block bus structure, comprising:

a rail (30), comprising two wedge sections (31) extended from two sides thereof separately; and at least two bus modules (100), serially connected with each other and mounted on the rail (30) along a longitudinal direction, and each of the bus modules (100) comprising an insulating body (10) and a plurality of conductors (20) parallelly embedded in the insulating body (10), the insulating body (10) comprising a first insulator (11), a second insulator (12) installed at a position corresponding to the first insulator (11) along the longitudinal direction, and two locking arms (111) disposed on two sides of the first insulator (11) separately, and the locking arms (111) snapped in the wedge sections (31) respectively, and each of the conductors (20) comprising a plate portion (21), a clamping portion (22) and an end pin (23), and the plate portion (21) exposed out of the first insulator (11) and the second insulator (12), and the clamping portion (22) and the end pin (23) coupled to two sides of the plate portion (21) in the longitudinal direction respectively, the clamping portion (22) accommodated within the second insulator (12) and the end pin (23) accommodated within the first insulator (11), and the clamping portion (22) of one of the bus modules (100) elastically clamping the end pin (23) of another one of the bus modules (100).

7. The terminal block bus structure according to claim 6, wherein the first insulator (11) of each of the bus modules (100) comprises at least one slot (113), and the end pin (23) is accommodated in the slot (113).

8. The terminal block bus structure according to claim 6, wherein the second insulator (12) of each of the bus modules (100) comprises a plurality of plug columns (122) disposed on a side away from the first insulator (11), and the clamping portion (22) is plugged in one of the plug columns (122).

9. The terminal block bus structure according to claim 6, wherein the first insulator (11) of each of the bus modules (100) comprises a plurality of combining holes (112), and the second insulator (12) comprises a plurality of combining columns (121), and the combining columns (121) are snapped and fixed in the combining holes (112) respectively.

10. The terminal block bus structure according to claim 6, wherein the first insulator (11) of each of the bus modules (100) comprises a foolproof structure (114) disposed on a side of the plate portion (21) away from the second insulator (12).

* * * * *